(12) United States Patent
Secall et al.

(10) Patent No.: US 9,866,975 B2
(45) Date of Patent: Jan. 9, 2018

(54) HEARING ASSISTANCE SYSTEM AND METHOD

(71) Applicant: SONOVA AG, Stäfa (CH)

(72) Inventors: Marc Secall, Constantine (CH); Amre El-Hoiydi, Neuchâtel (CH); Stephan Gehring, Uerikon (CH); Hilmar Meier, Herrliberg (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 15/308,924

(22) PCT Filed: May 28, 2014

(86) PCT No.: PCT/EP2014/061150
§ 371 (c)(1),
(2) Date: Nov. 4, 2016

(87) PCT Pub. No.: WO2014/114819
PCT Pub. Date: Jul. 31, 2014

(65) Prior Publication Data
US 2017/0070830 A1    Mar. 9, 2017

(51) Int. Cl.
*H04R 25/00* (2006.01)
*H04W 8/00* (2009.01)

(52) U.S. Cl.
CPC ......... *H04R 25/554* (2013.01); *H04W 8/005* (2013.01); *H04R 2225/55* (2013.01); *H04R 2460/03* (2013.01)

(58) Field of Classification Search
CPC .... H04R 25/70; H04R 25/356; H04R 25/505; H04R 25/552; H04R 25/554; H04R 25/558; H04R 2225/41; H04R 2225/55; H04R 2460/03; H04W 8/005
See application file for complete search history.

(56) References Cited

U.S. PATENT DOCUMENTS

| | | |
|---|---|---|
| 6,664,891 B2 | 12/2003 | Davies et al. |
| 7,751,578 B2 | 7/2010 | Arz et al. |
| 8,155,359 B2 | 4/2012 | Beck |
| 8,488,822 B2 | 7/2013 | Klemmensen |
| 8,666,314 B2 | 3/2014 | Lotter et al. |
| 8,811,639 B2 | 8/2014 | Solum et al. |
| 9,191,988 B2 | 11/2015 | Newham |
| 9,426,586 B2 | 8/2016 | Solum et al. |

(Continued)

*Primary Examiner* — Brian Ensey

(57) ABSTRACT

A hearing assistance system having a hearing assistance device to be worn at one of a user's ears and a scanning device, the hearing assistance device and the scanning device both having an interface for wireless data exchange between the hearing assistance device and the scanning device, wherein the hearing assistance device is adapted for wireless data exchange with an external device, wherein the scanning device is adapted to scan for wireless signals from the external device and to transmit, once such signals have been received by the scanning device, a message to the hearing assistance device for notifying the hearing assistance device of the availability of the external device, and wherein the hearing assistance device is adapted to decide, upon receipt of such notification message from the scanning device, whether on not to initiate wireless data exchange with the external device.

22 Claims, 3 Drawing Sheets

(56) References Cited

U.S. PATENT DOCUMENTS

| | | | | |
|---|---|---|---|---|
| 2008/0240453 | A1* | 10/2008 | Westergaard | H04R 25/70 381/60 |
| 2011/0249842 | A1* | 10/2011 | Solum | H04R 25/554 381/315 |
| 2013/0316642 | A1 | 11/2013 | Newham | |
| 2013/0316649 | A1* | 11/2013 | Newham | H04W 88/04 455/41.2 |
| 2014/0169599 | A1* | 6/2014 | Solum | H04R 25/554 381/315 |
| 2015/0341973 | A1* | 11/2015 | El-Hoiydi | H04W 84/18 455/3.06 |

* cited by examiner

HEARING ASSISTANCE SYSTEM AND METHOD

BACKGROUND OF THE INVENTION

Field of the Invention

The invention relates to a hearing assistance system comprising a hearing assistance device to be worn at one of a user's ears and which is adapted for wireless data exchange with an external device.

Description of Related Art

Hearing assistance devices, such as hearing aids, may be designed for wireless connectivity to devices like wireless microphones, mobile phones, and other consumer electronic devices, such as TV sets, in order to be able to communicate with such devices. To this end, different communication interfaces and protocols may be used, thereby significantly increasing complexity of the hearing assistance device. In such a wireless system the hearing assistance device has to look constantly for devices to connect to; however, this "scanning" process imposes a significant burden both in terms of power consumption and system load.

In particular, hearing aids are extremely miniaturized, power constrained devices with limited computing resources. Thus, the scanning process, in particular for a large number of communication devices, poses significant problems: in an unconnected state, the hearing aid has to constantly scan for devices at a relatively high scan rate in order to allow a rapid communication setup; in a connected state (in which the hearing aid is paired to a communication device, for example, in order to receive an audio stream) other relevant devices may appear in the environment of the hearing aid, so that also in this case the hearing aid has to constantly scan at a high rate in order to allow rapid connection to a device offering an alternative audio source.

U.S. Pat. No. 8,155,359 B2 relates to a plurality of hearing aids, wherein a remote control of one of the hearing aids is used as a base station for enabling wireless communication between the hearing aids. Such communication network may be expanded by further remote controls acting as base/relay stations which log on to each other and control the data transfer; the resulting network of base stations continuously searches for the best transmission route via all the logged-on base stations.

U.S. Pat. No. 7,751,578 B2 relates to a hearing aid having a remote control which functions as an intermediary between a low-rated network for domestic appliances in order to enable the hearing aid to participate fully in the network; the remote control may be used not only to call up the network, but also to control it. The hearing aid may form part of a binaural system comprising a second hearing aid at the other ear which is wirelessly connected to the first hearing aid.

U.S. Pat. No. 8,666,314 B2 relates to a wireless audio signal transmission system, such as from a TV set to a hearing aid, wherein the audio signal is transmitted as a BLUETOOTH® signal to a relay station which converts the BLUETOOTH® signal into a signal for inductive transmission to the hearing aid. The relay station may be integrated into a remote control of the hearing aid or a remote control of the TV set.

U.S. Pat. No. 8,488,822 B2 relates to a hearing assistance system comprising a Digital Enhanced Cordless Telecommunications (DECT) transmitter connected in a wired or wireless manner to audio sources, such as a microphone, a TV set or a mobile phone, in order to transmit audio signals via a DECT link to a plurality of DECT receivers which may form part of a binaural hearing aid system.

U.S. Pat. No. 6,664,891 B2 relates to a communication system comprising a plurality of portable communication devices, wherein Bluetooth protocols are used to broadcast a series of inquiry messages from a first communication device to a second communication device; for the delivery of additional data the first communication device may add to each inquiry message prior to transmission an additional data field carrying broadcast data.

SUMMARY OF THE INVENTION

It is an object of the invention to provide for a hearing assistance system comprising a hearing assistance device capable of wirelessly communicating with an external device and having particularly low power consumption and a relatively low system load required for the communication with the external device.

It is a further object to provide for a corresponding hearing assistance method.

According to the invention, these objects are achieved by a hearing assistance system and a hearing assistance method as described herein.

The invention is beneficial in that, by using a scanning device connected to the hearing assistance device for scanning for wireless signals from the external device to be connected to the hearing assistance device and transmitting, once such signals have been received by the scanning device, a message to the hearing assistance device to notify the hearing assistance device of the availability of the external device, the power consuming and load-adding scanning actions required for detecting the presence of the external device can be shifted to the scanning device, so that the power consumption and the computational load of the hearing assistance device can be reduced while nevertheless the external device can be detected sufficiently fast.

Typically, the scanning device is a device which is usually anyway continuously connected to the hearing assistance device, such as an audio communication device like a mobile phone, a landline phone or an internet device, an accessory device of the hearing assistance device, like a wireless microphone, a remote control or an audio streamer device, or a consumer electronic device like a TV set, a personal computer, a tablet computer, a radio device, a media player or a generic remote control. Typically, such devices have a significantly larger battery capacity compared to an ear-level hearing assistance device, such as a hearing aid.

Hereinafter, examples of the invention will be described with reference to the accompanying drawings.

DETAILED DESCRIPTION OF THE INVENTION

Figure 1:
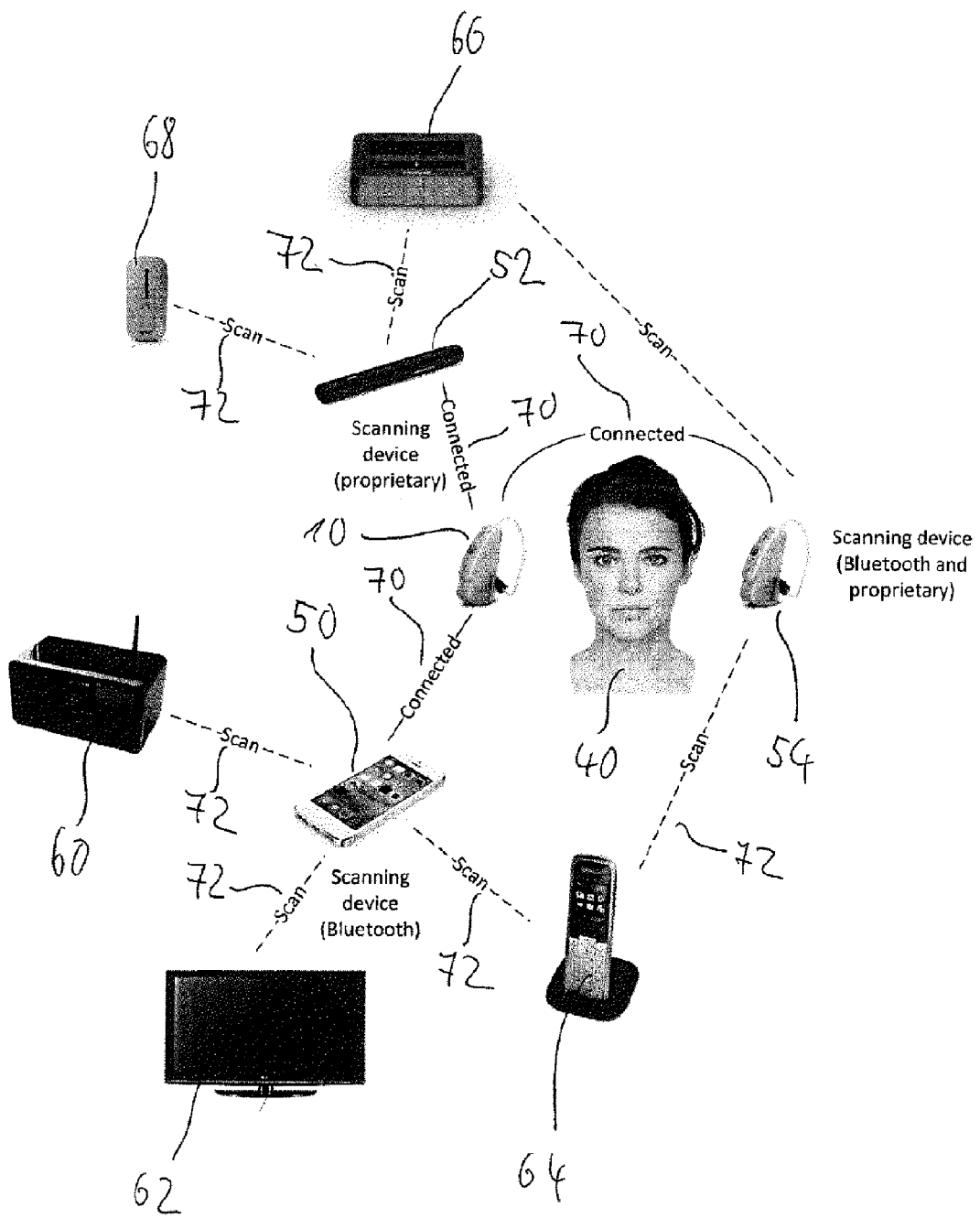
FIG. 1 shows a physical overview of an example of a hearing assistance system according to the invention.

An example of a hearing assistance system according to the invention is shown in FIG. 1, with the system comprising at least one hearing assistance device 10 and at least one scanning device 50, 52, 54, wherein both the hearing assistance device 10 and the scanning device 50, 52, 54 comprise an interface (not shown in FIG. 1) for wireless data exchange with each other via a wireless link 70. The hearing assistance device 10 is adapted for wireless data exchange with an external device 60, 62, 64, 66, 68 via a link (72 in FIG. 2). The scanning device 50, 52, 54 is adapted to scan for wireless signals from the external device 60, 62, 64, 66, 68 and to transmit, once such signals have been received, a message to the hearing assistance device 10 via the link 70 for notifying the hearing assistance device 10 of the availability of the external device 60, 62, 64, 66, 68. The hearing assistance device 10 is adapted to decide, after having received such a notification message from the scanning device 10 via the link 70, whether to initiate wireless data exchange with the external device or not.

The scanning device is a device which is typically continuously connected to the hearing assistance device. One example is a mobile phone 50 which is carried by a user 40 of the hearing assistance device 10 so that an incoming phone call can be directly routed to the hearing assistance device 10. However, also other audio communication devices, such as a landline phone or an internet phone device ("voice over IP") may be used as a scanning device. Further examples of devices which may be used as a scanning device are consumer devices, like a TV-set, a personal computer, a tablet computer, a radio device, a media player or a generic remote control. According to another example, an accessory device of the hearing assistance device 10, such as a wireless microphone 52, a hearing assistance device remote control or an audio streamer device, may be used as a scanning device. According to a still further example, even a hearing assistance device 54 worn at the other ear of the user 40 which is connected to the hearing assistance device 10 via a binaural link 70 may be used as a scanning device. Preferably, the scanning device is a hand held or body worn device.

Typically, the hearing assistance device is a hearing aid 10, which is worn at or at least partly within an ear of the user 40 such as a BTE (behind the ear), ITE (in the ear) or CIC (completely in the channel) hearing aid. However, the hearing assistance device, for example, also could be an auditory prosthesis, such as a cochlear implant device.

The external devices which can be discovered by the scanning device depend on the underlying wireless communication technology and may include BLUETOOTH® devices using, for example, BLUETOOTH® Classic, BLUETOOTH® Low Energy or any other implementation of the BLUETOOTH® standard, other standardized communication technologies/protocols, such as WiFi (WLAN), and proprietary communication technologies/protocols. Such devices may include audio communication devices like mobile phones, landline phones or internet phone devices, consumer devices like TV-sets, personal computers, tablet computers, radio devices, media players or generic remote controls, and accessory devices of the hearing assistance device, like wireless microphones, remote controls, audio streamer devices or programming devices.

The following examples of the external device are shown in FIG. 1: a radio device 60, a TV set 62, a DECT phone device 64, a streaming device 66 and a wireless microphone 68.

According to another example, the external device may be a hearing assistance device worn by another person (not shown in FIG. 1).

According to one example, the interface used for establishing the wireless link between the hearing assistance device and the scanning device may be also suitable for wireless data exchange with the external device. For example, the link 70 may be a BLUETOOTH® link, such as in case that a mobile phone 50 is used as the scanning device. According to an alternative example, the link 70 may be based on a proprietary technology, as in the example of FIG. 1 in which a hearing assistance accessory device, like a wireless microphone 52, is used as the scanning device.

According to an alternative example, the hearing assistance device 10 may comprise an additional interface for the wireless data exchange with the external device, namely in cases in which the link to the scanning device is based on a technology different to the link used for connecting the hearing assistance device to the external device (in this case, also the scanning device has two different interfaces). For example, a hearing assistance device 54 used as the scanning device may comprise a proprietary interface for establishing a binaural link 70 to the hearing assistance device 10 and a standardized interface, such as a Bluetooth interface, for connecting to external devices like a phone device 64, with the standardized interface being used for scanning for such devices; the proprietary interface of the hearing assistance device 54 may be used not only for the binaural link 70 but also for connecting to—and scanning for—accessory devices like a streaming device 66.

Typically, the device used as the scanning device has a larger battery capacity than the hearing assistance device, or might even be powered from the mains, so that, by "outsourcing" the scanning procedure, the power consumption of the hearing assistance device can be reduced, thereby extending the battery lifetime of the hearing assistance device.

However, even if also the scanning device has severe power constraints, the outsourcing of the scanning procedure is beneficial in that the system load required for the scanning procedure is eliminated in the hearing assistance device. For example, if a hearing assistance device worn at the other ear is used as the scanning device, the total system load in terms of radio air time, computing requirements and power consumption is distributed among both hearing assistance devices, thus reducing complexity of the individual hearing assistance device.

Figure 3:
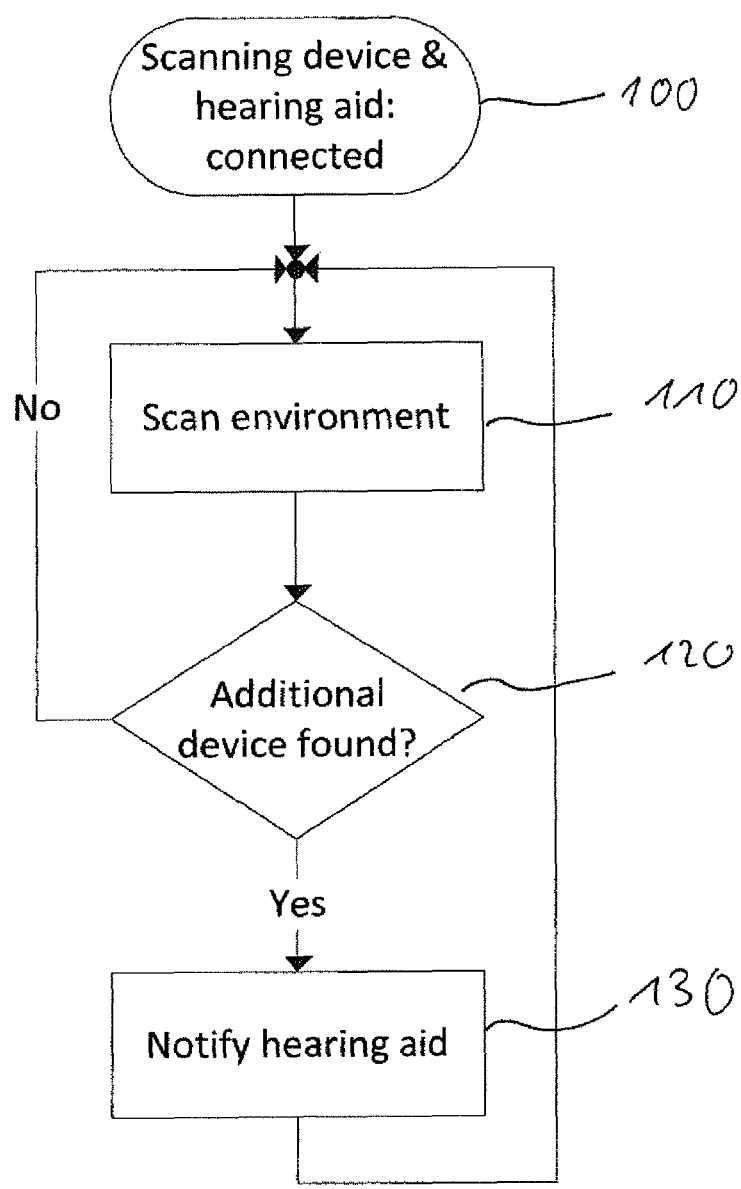
FIG. 3 is a flow chart of an example of a scanning procedure to be used in accordance with the present invention.

A flow chart of an example of the scanning procedure is shown in FIG. 3, according to which first the scanning device and the hearing assistance device are connected, after having been paired, as indicated in step 100. The scanning procedure is implemented as a program in the scanning device; such programming may occur already during manufacturing of the scanning device (for example, in case that the scanning device is a hearing aid accessory device or a hearing aid) or it may be later programmed when the scanning device is actually used (for example, in case that the scanning device is a mobile phone, the scanning procedure may be implemented as an "app").

For example, the scanning procedure may be started automatically when the hearing assistance device is connected to the scanning device in step 100 (alternatively, the scanning procedure may be initiated by hearing assistance device), and then the scanning device may regularly scan for wireless signals from the external device as long as the scanning device is connected to the hearing assistance device. As indicated in step 110 in FIG. 3, the scanning device is scanning for signals from appropriate external devices (the type of devices to be notified to the hearing assistance device may be specified in the scanning procedure). In step 120 the scanning device decides whether an appropriate external device has been found or not: if the answer is "no", the scanning step 110 is repeated; if the answer is "yes", a corresponding notification message is transmitted to the hearing assistance device via the link 70 in step 130 in order to make the hearing assistance device aware of the presence of an appropriate external device. Thereafter, the scanning device resumes the scanning activity of step 110.

Once the hearing assistance device has received such notification message from a scanning device it may take one or more of the following actions: the hearing assistance device may determine whether the detected external device already had been paired with the hearing assistance device before; if not, the hearing assistance device may decide to initiate pairing with the external device. In case that the device already had been paired previously with the hearing assistance device, the hearing assistance device may decide whether to connect to the external device or not. Once a connection between the hearing assistance device and the external device has been established, the hearing assistance device may decide whether or not an audio/data transfer shall take place.

Figure 2:
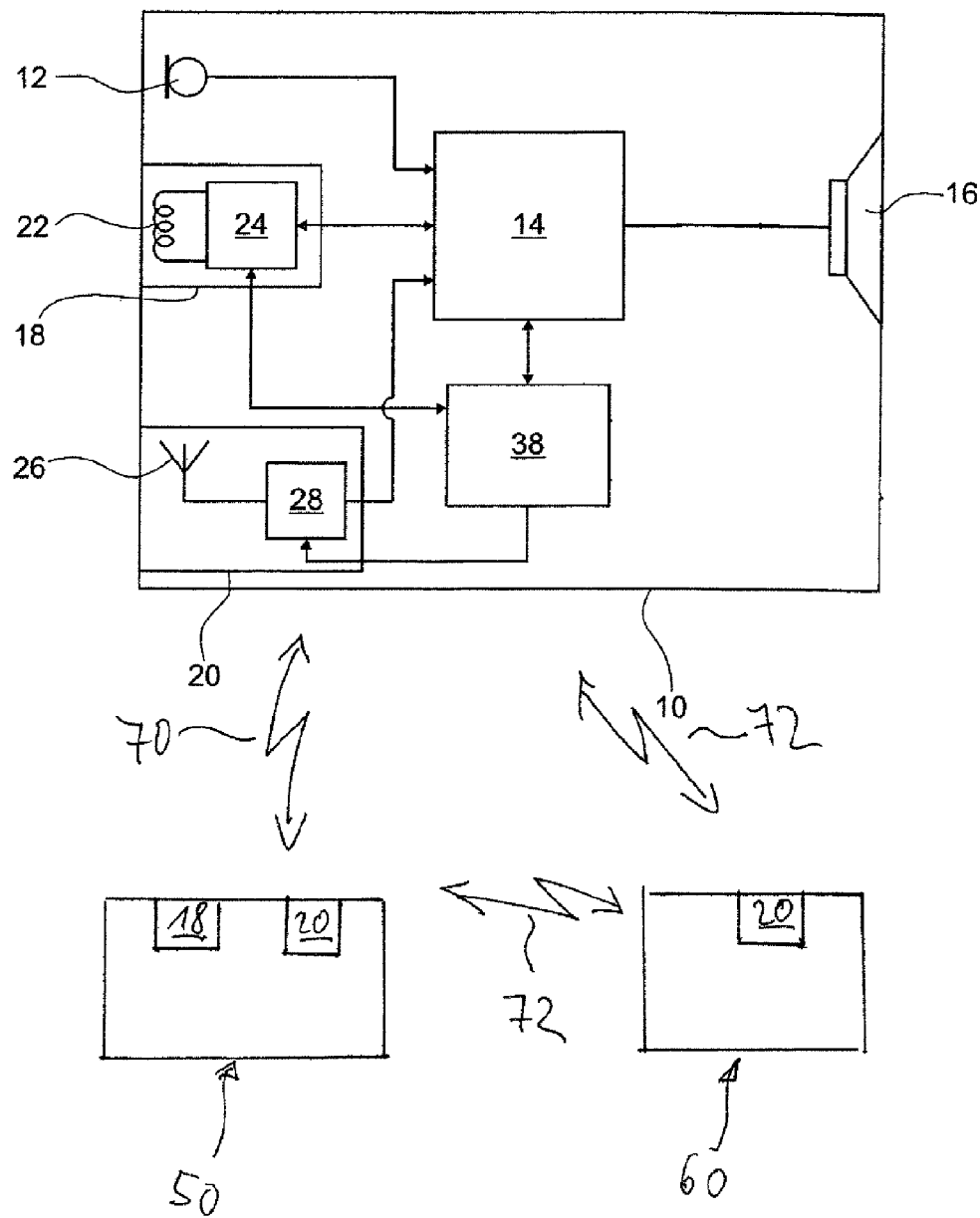
FIG. 2 is a schematic block diagram of an example of a hearing assistance system according to the invention.

FIG. 2 is a block diagram of an example of a system comprising a hearing assistance device 10 to be worn at an ear of a user, scanning device 50 and an external device 60.

According to the example of FIG. 2, the hearing assistance device 10 is an electro-acoustic hearing aid comprising a microphone arrangement 12 for capturing audio signals from ambient sound, an audio signal processing unit 14 for processing the captured audio signals and an electro-acoustic output transducer (loudspeaker) 16 for stimulation the user's hearing according to the processed audio signals.

The hearing instrument 10 also comprises a first wireless interface 18 and a second wireless interface 20. The first interface 18 comprises an antenna 22 and a transceiver 24, and the second interface comprises an antenna 26 and a transceiver 28.

The first interface 18 is provided for enabling wireless data exchange between the first hearing assistance device 10 and the scanning device 50 via the wireless link 70 which, according to one example, may be an inductive link which may operate, for example, in a frequency range of 6.765 MHz to 13.567 MHz, such as at 10.6 MHz. For example, the first interface 18 may be designed to form part of a hearing instrument body area network (HIBAN). However, rather than being implemented as an inductive link, the wireless link 70 may be a far-field link requiring, such as a proprietary or standard digitally modulated link operating in the 2.4 GHz ISM band.

The second interface 20 is provided for data exchange via a wireless link 72 from an external device 60, for example for receiving a data stream from an external device 60 acting as a data source. For example, the second interface 20 may be adapted to operate in a frequency range of 0.38 GHz to 5.825 GHz, preferably at frequencies around 2.4 GHz in the ISM band. For example, the second interface 20 may be a BLUETOOTH® interface or a WLAN (WiFi) interface.

Preferably, the external data stream is an audio data stream which may be mono stream or a stereo stream; alternatively or in addition the external data stream may include control data or meta-data. The external device 60 may be, for example, a phone device, such as a mobile phone or a DECT phone device, a music player, a HiFi set, a TV set or a wireless microphone.

The hearing assistance device 10 also comprises a controller 38 for controlling operation of the hearing instrument 10, with the controller 38 acting on the signal processing unit 14 and the transceivers 24 and 28.

The scanning device 50 is provided with an interface 18 for establishing the link 70 to the hearing assistance device 10 and an interface 20 for scanning the environment for signals transmitted by the external device 60 via the link 72.

The external device 60 likewise comprises an interface 20 for transmitting data/signals via the link 72 to the hearing assistance device 10 and the scanning device 50.

This is one of many possible examples. For instance, the interface 18 could support a proprietary protocol, whereas the interface 20 supports a standard link. Both interfaces 18 and 20 could share the same radio modem and just implement different protocols. According to another example, there is only one interface, such as the second interface 20, which is used for both wireless links 70 and 72, with the first interface 18 then being omitted in the hearing assistance device 10 and the scanning device 50 in FIG. 2.

What is claimed is:

1. A hearing assistance system, comprising a hearing assistance device (10) to be worn at one of a user's ears and a scanning device (50, 52, 54),
    the hearing assistance device and the scanning device both comprising an interface (18) for wireless data exchange between the hearing assistance device and the scanning device,
    wherein the hearing assistance device is adapted for wireless data exchange with an external device (60, 62, 64, 66, 68),
    wherein the scanning device is adapted to scan for wireless signals from the external device and to transmit, once such signals have been received by the scanning device, a message to the hearing assistance device for notifying the hearing assistance device of the availability of the external device, and
    wherein the hearing assistance device is adapted to decide, upon receipt of such notification message from the scanning device, whether to initiate wireless data exchange with the external device or not.

2. The system of claim 1, wherein the hearing assistance device (10) comprises an additional interface (20) for the wireless data exchange with the external device (60, 62, 64, 66, 68).

3. The system of claim 2, wherein the additional interface (20) of the hearing assistance device (10) is a standardized interface, or a WiFi interface, or a proprietary interface.

4. The system of claim 1, wherein the interface for wireless data exchange with the scanning device (50, 52, 54) is also is able to perform wireless data exchange with the external device.

5. The system of claim 4, wherein the interface is a standardized interface.

6. The system of claim 4, wherein the interface (18) of the hearing assistance device (10) is a proprietary interface.

7. The system of claim 1, wherein the hearing assistance device is a hearing aid (10) or an auditory prosthesis.

8. The system of claim 1, wherein the scanning device (50, 52) is a handheld device.

9. The system of claim 1, wherein the scanning device is an audio communication device.

10. The system of claim 1, wherein the scanning device is a TV-set, a personal computer, a tablet computer, a radio device, a media player or a generic remote control.

11. The system of claim 1, wherein the scanning device is an accessory device (52) of a hearing assistance device, such as a wireless microphone, a hearing assistance device remote control or an audio streamer device.

12. The system of claim 1, wherein the scanning device is a hearing assistance device (54) to be worn at the other ear of the user (40) and being adapted to establish a binaural hearing system by data exchange via their wireless interfaces.

13. The system of claim 1, wherein the hearing assistance device (10) is adapted to determine, after receipt of a notification message from the scanning device (50, 52, 54), whether the external device (60, 62, 64, 66, 68) already had been paired with the hearing assistance device or not.

14. The system of claim 13, wherein the hearing assistance device (10) is adapted to decide, in case that the external device (60, 62, 64, 66, 68) already had been paired with the hearing assistance device, whether to connect to the external device or not.

15. The system of claim 13, wherein the hearing assistance device (10) is adapted to decide, in case that the external device (60, 62, 64, 66, 68) already had been paired with the hearing assistance device, whether to connect to the external device or not, and wherein the hearing assistance device (10) is adapted to decide, in case that the external device (60, 62, 64, 66, 68) had not yet been paired with the hearing assistance device, whether to initiate pairing with the external device or not.

16. The system of claim 1, wherein the scanning device (50, 52, 54) is adapted to regularly scan for wireless signals from the external device (60, 62, 64, 66, 68) as long as the scanning device is connected to the hearing assistance device (10).

17. The system of claim 1, wherein the scanning device (50, 52, 54) is adapted to automatically start to scan for wireless signals from the external device (60, 62, 64, 66, 68) once the scanning device is connected to the hearing assistance device (10).

18. A method of providing hearing assistance to a user (40) wearing a hearing assistance device (10) at one of the user's ears, with the hearing assistance device being adapted for wireless data exchange with an external device (60, 62, 64, 66, 68), the method comprising:
    connecting the hearing assistance device to a scanning device (50, 52, 54) via a wireless link (70) in order to exchange data between the hearing assistance device and the scanning device via the wireless link;
    scanning, by the scanning device, for wireless signals from the external device and transmitting, once such signals have been received by the scanning device, a message from the scanning device to the hearing assistance device for notifying the hearing assistance device of the availability of the external device, and
    deciding, by the hearing assistance device, upon receipt of such notification message, whether to initiate wireless data exchange with the external device or not.

19. The method of claim 18, wherein the external device is an audio communication device.

20. The method of claim 18, wherein the external device is a TV-set (62), a personal computer, a tablet computer, a radio device (60), a media player or a generic remote control.

21. The method of claim 18, wherein the external device is an accessory device of the hearing assistance device.

22. The method of claim 18, wherein the external device is a hearing assistance device to be worn by another person.

* * * * *